(12) United States Patent
Wei

(10) Patent No.: US 8,932,192 B2
(45) Date of Patent: Jan. 13, 2015

(54) INVERTED MACHINE

(75) Inventor: Tsao-Kuang Wei, Taichung (TW)

(73) Assignee: Paradigm Inc., Taichung (TW)

( * ) Notice: Subject to any disclaimer, the term of this patent is extended or adjusted under 35 U.S.C. 154(b) by 342 days.

(21) Appl. No.: 13/542,053

(22) Filed: Jul. 5, 2012

(65) Prior Publication Data
US 2014/0011650 A1 Jan. 9, 2014

(51) Int. Cl.
*A63B 26/00* (2006.01)

(52) U.S. Cl.
USPC ......................................... 482/144

(58) Field of Classification Search
USPC ............. 482/51, 63, 65, 92–96, 98–100, 482/114–116, 118–119, 140, 142–145, 482/907; 128/845; 297/83–84, 325, 327; 601/1, 23–25
See application file for complete search history.

(56) References Cited

U.S. PATENT DOCUMENTS

| | | | |
|---|---|---|---|
| 6,679,818 B2 * | 1/2004 | Hsien | 482/144 |
| 7,500,939 B2 * | 3/2009 | Chen | 482/144 |
| 7,867,154 B2 * | 1/2011 | Teeter et al. | 482/144 |

* cited by examiner

*Primary Examiner* — Loan H. Thanh
*Assistant Examiner* — Jennifer M Deichl
(74) *Attorney, Agent, or Firm* — Hershkovitz & Associates, PLLC; Abraham Hershkovitz

(57) ABSTRACT

An inverted machine has a supporting bracket, an orientating assembly, a connecting frame and a table. The supporting bracket has two supporting shafts, two mounting jackets and a locating sheath mounted around one of the mounting jackets. The orientating assembly is connected to the supporting bracket and has a brake locator, a rotating shaft, two clamping slices, a pulling rod, a spring and a cam device. The brake locator is connected to the mounting jacket that is connected to the locating sheath. The rotating shaft is connected to the other mounting jacket. The clamping slices are pivotally connected to the brake locator. The pulling rod is connected to the clamping slices. The spring is mounted around the pulling rod between the clamping slices. The cam device is connected to the pulling rod. The connecting frame is connected to the orientating assembly. The table is mounted on the connecting frame.

6 Claims, 6 Drawing Sheets

INVERTED MACHINE

BACKGROUND OF THE INVENTION

1. Field of the Invention

The present invention relates to an inverted machine, and more particularly to an inverted machine that can be operated easily and safely.

2. Description of Related Art

A conventional inverted machine has a mounting bracket, a connecting frame and an ankle clamp assembly. The connecting frame is pivotally connected to the mounting frame and has a top face, a lower end and a table. The table is mounted on the top face of the connecting frame. The ankle clamp assembly is connected to the lower end of connecting frame and clamps and holds a person's ankles when the table is pivoted to an inverted position. When the connecting frame is rotated relative to the mounting frame to allow a person to be upside down, feet-up posture, and this can stretch the back muscles and can achieve fitness results of spine, knee, ankle and other joints of the person.

However, because the conventional inverted machine does not have a brake mechanism mounted between the mounting frame and the connecting frame, the table of the conventional inverted machine only can be rotated at an upright angle or an inverted angel and cannot be adjusted at different angles according to the needs of the users. In addition, when the user goes down backwardly, the user tends to lose balance, and, in reaction to that, the user may pull his muscles to try to get back up and this may hurt the user's back and is unsafe in use. Furthermore, the table of the conventional inverted machine is pivoted relative to the mounting frame by the user's body balance and the user may feel unsafe during the pivoting period.

The invention provides an inverted machine that mitigates or obviates the aforementioned problems.

SUMMARY OF THE INVENTION

The main objective of the present invention is to provide an inverted machine that can be operated easily and safely.

The inverted machine for an inverted machine in accordance with the present invention and has a supporting bracket, an orientating assembly, a connecting frame and a table. The supporting bracket has two supporting shafts, two mounting jackets and a locating sheath mounted around one of the mounting jackets. The orientating assembly is connected to the supporting bracket and has a brake locator, a rotating shaft, two clamping slices, a pulling rod, a spring and a cam device. The brake locator is connected to the mounting jacket that is connected to the locating sheath. The rotating shaft is connected to the other mounting jacket. The clamping slices are pivotally connected to the brake locator. The pulling rod is connected to the clamping slices. The spring is mounted around the pulling rod between the clamping slices. The cam device is pivotally connected to the pulling rod. The connecting frame is connected to the orientating assembly. The table is mounted on the connecting frame.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
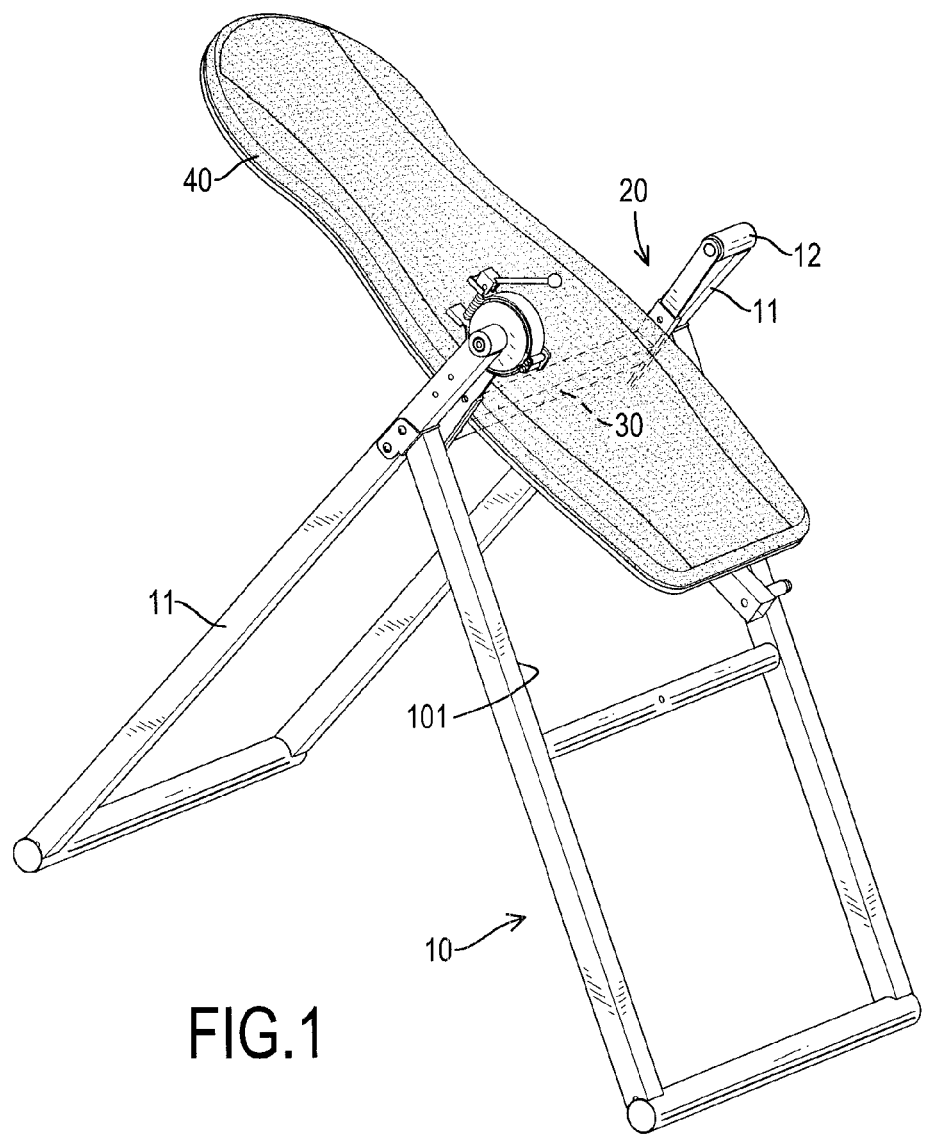
FIG. 1 is a perspective view of an inverted machine in accordance with the present invention.

With reference to FIGS. 1 to 4, an inverted machine in accordance with the present invention has a supporting bracket 10, an orientating assembly 20, a connecting frame 30 and a table 40.

The supporting bracket 10 has a rear frame, a front frame, a swing space 101, two mounting jackets 12 and a locating sheath 14. The rear frame may be U-shaped and has two supporting shafts 11. The supporting shafts 11 are defined respectively as a first supporting shaft 11 and a second supporting shaft 11. Each supporting shaft 11 has a top end and an inner surface. The front frame may be H-shaped and is connected to the supporting shafts 11 of the rear frame below the top ends of the supporting shafts 11. The swing space 101 is defined between the rear frame and the front frame of the supporting bracket 10.

The mounting jackets 12 are cylindrical, are defined respectively as a first mounting jacket 12 and a second mounting jacket 12, are respectively and transversally mounted on the top ends of the supporting shafts 11 of the rear frame and align with each other. That is the first mounting jacket 12 is mounted on the first supporting shaft 11 and the second mounting jacket 12 is mounted on the second supporting shaft 11. Each mounting jacket 12 has an inner end, an outer end and two liner collars 13. The inner ends of the first mounting jackets 12 and the second mounting jacket 12 respectively extend out of the inner surfaces of the first supporting shafts 11 and the second supporting shaft 11. The liner collars 13 are respectively mounted in the ends of the mounting jacket 12. The locating sheath 14 is mounted around the first mounting jacket 12 via the inner end of the first mounting jacket 12 and has an external surface and a friction face 141. The friction face 141 is formed around the external surface of the locating sheath 14.

The orientating assembly 20 is connected to the rear frame of the supporting bracket 10 and has a brake locator 21, a rotating shaft 22, two clamping slices 23, 24, a pulling rod 25, a spring 26 and a cam device 27.

The brake locator 21 is connected to the first mounting jacket 12 that is connected to the locating sheath 14 and has a rotating rod 211, a connecting beam 212 and a linking mount 213. The rotating rod 211 is rotatably mounted in the liner collars 13 of the first mounting jacket 12 and has an inner end extending out of the inner end of the first mounting jacket 12. The connecting beam 212 is connected to and protrudes downwardly from the inner end of the rotating rod 211. The linking mount 213 is elongated, is formed on and protrudes from the connecting beam 212 adjacent to the inner end of the rotating rod 211 and has an outer side and two mounting rods 2131, 2132. The outer side of the linking mount 213 faces the locating sheath 14. The mounting rods 2131, 2132 are formed on and protrude from the outer side of the linking mount 213 at an interval and are respectively an upper mounting rod 2131 and a lower mounting rod 2132.

The rotating shaft 22 is rotatably mounted in the liner collars 13 of the second mounting jacket 12 that is opposite to the brake locator 21 and has an inner end and a connecting beam 221. The connecting beam 221 is connected to and protrudes from the inner end of the rotating shaft 22 and parallels the connecting beam 212 of the brake locator 21.

The clamping slices 23, 24 are semi-arc shaped, are pivotally connected to the linking mount 213 of the brake locator 21 and respectively an upper clamping slice 23 and a lower clamping slice 24.

The upper clamping slice 23 is pivotally connected to the linking mount 213 and has a front end, a rear end, an internal surface, a mounting tube 231, an extending board 232, a through hole 233 and a brake band 234. The internal surface of the upper clamping slice 23 is mounted around the friction face 141 of the locating sheath 14. The mounting tube 231 is transversally formed on and protrudes from the front end of the upper clamping slice 23 and is rotatably mounted around the upper mounting rod 2131 of the linking mount 213. The extending board 232 is formed on and protrudes from the rear end of the upper clamping slice 23 and has a top face. The through hole 233 is formed through the extending board 232 and has a diameter. The brake band 234 is mounted on the internal surface of the upper clamping slice 23 and abuts the friction face 141 of the locating sheath 14.

The lower clamping slice 24 is pivotally connected to the linking mount 213 and has a front end, a rear end, an internal surface, a mounting tube 241, an extending board 242, a through hole 243 and a brake band 244. The internal surface of the lower clamping slice 24 is mounted around the friction face 141 of the locating sheath 14. The mounting tube 241 is transversally formed on and protrudes from the front end of the lower clamping slice 24 and is rotatably mounted around the lower mounting rod 2132 of the linking mount 213. The extending board 242 is formed on and protrudes from the rear end of the lower clamping slice 24 and has a bottom face. The through hole 243 is formed through the extending board 242. The brake band 244 is mounted on the internal surface of the lower clamping slice 24 and abuts the friction face 141 of the locating sheath 14.

The pulling rod 25 is connected to the clamping slices 23, 24 and has a bottom end, a top end, a head 251, a threaded segment 252 and a nut 253. The bottom end of the pulling rod 25 is mounted through the through holes 233, 243 of the extending boards 23, 24. The head 251 is formed on and protrudes from the top end of the pulling rod 25 above the extending board 232 of the upper clamping slice 23 and has a diameter, two opposite sides and an inner pivot hole 2511. The diameter of the head 251 is larger than the diameter of the through hole 233 of the upper clamping slice 23. The inner pivot hole 2511 is formed through the opposite sides of the head 251. The threaded segment 252 is formed around the bottom end of the pulling rod 25 and extends out of the extending board 242 of the lower clamping slice 24. The nut 253 is screwed with the threaded segment 252 of the pulling rod 25 and abuts the bottom face of the extending board 242 of the lower clamping slice 24.

The spring 26 is mounted around the pulling rod 25 and has two ends respectively abut the extending boards 232, 242 of the clamping slices 23, 24.

The cam device 27 is pivotally connected to the pulling rod 25, abuts the extending board 232 of the upper clamping slice 23 and has a bottom, a top, a rear side, a front side, two sidewalls, a curved face 271, a mounting groove 272, an outer pivot hole 273, a pivot rod 274 and a handle 275. The bottom of the cam device 27 is flat and abuts the top face of the extending board 232 of the upper clamping slice 23. The curved face 271 is formed on the rear side of the cam device 27 between the bottom and the top of the cam device 27. The mounting groove 272 is formed through the bottom and the front side of the cam device 27 between the rear side and the sidewalls of the cam device 27 and is mounted around the head 251 of the pulling rod 25. The outer pivot hole 273 is formed through the sidewalls of the cam device 27 near the front side and the bottom of the cam device 27, communicates with the mounting groove 272 and aligns with the inner pivot hole 2511 of the head 251. The distance between the outer pivot hole 273 and the rear side of the cam device 27 is longer than the distance between the outer pivot hole 273 and the bottom of the cam device 27. The pivot rod 274 is mounted through the pivot holes 2511, 273 of the head 251 and the cam device 27 to connect the cam device 27 pivotally with the head 251 of the pulling rod 25. The handle 275 is formed on and protrudes from the top of the cam device 27 upwardly and forwardly.

The connecting frame 30 is connected to the connecting beams 212, 221 of the orientating assembly 20 between the first supporting shaft 11 and the second supporting shaft 11 to enable the connecting frame 30 to rotate relative to the supporting bracket 10 and has a top face. The table 40 is securely mounted on the top face of the connecting frame 30 in the swing space 101 of the supporting bracket 10.

The brake locator 21 and the locating sheath 14 of the inverted machine in accordance with the present invention above-mentioned are selectively connected to one of the mounting jackets 12 of the supporting bracket 10.

Figure 2:
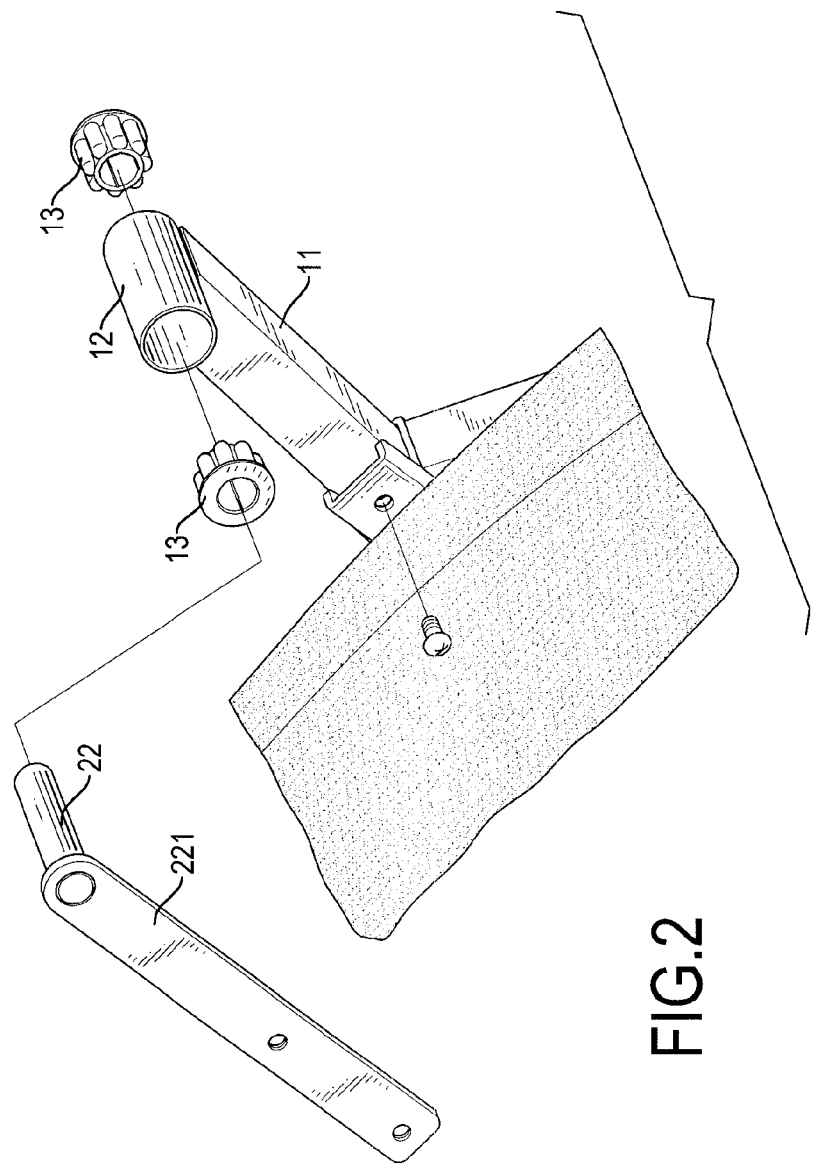
FIG. 2 is an enlarged exploded perspective view of the inverted machine in FIG. 1.
Figure 3:
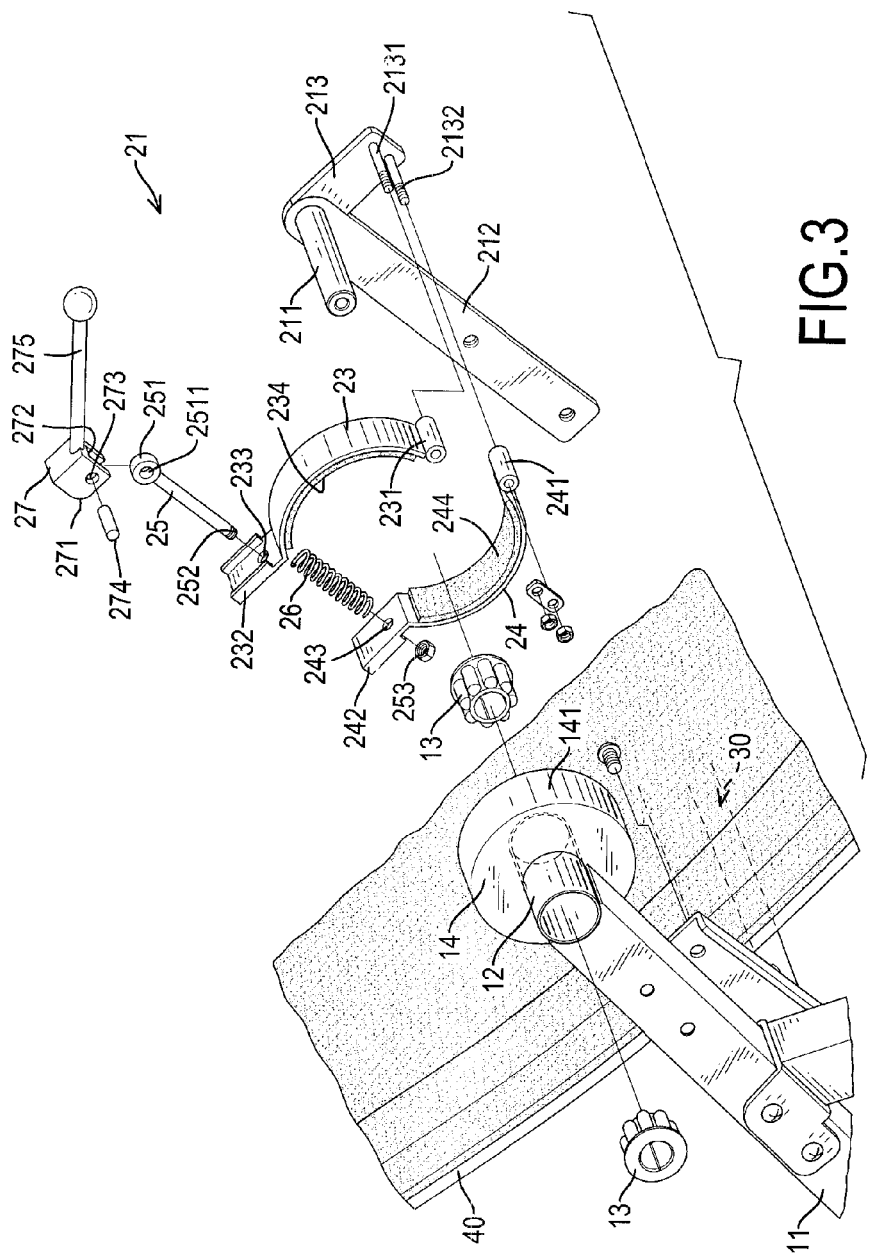
FIG. 3 is another enlarged exploded perspective view of the inverted machine in FIG. 1.
Figure 4:
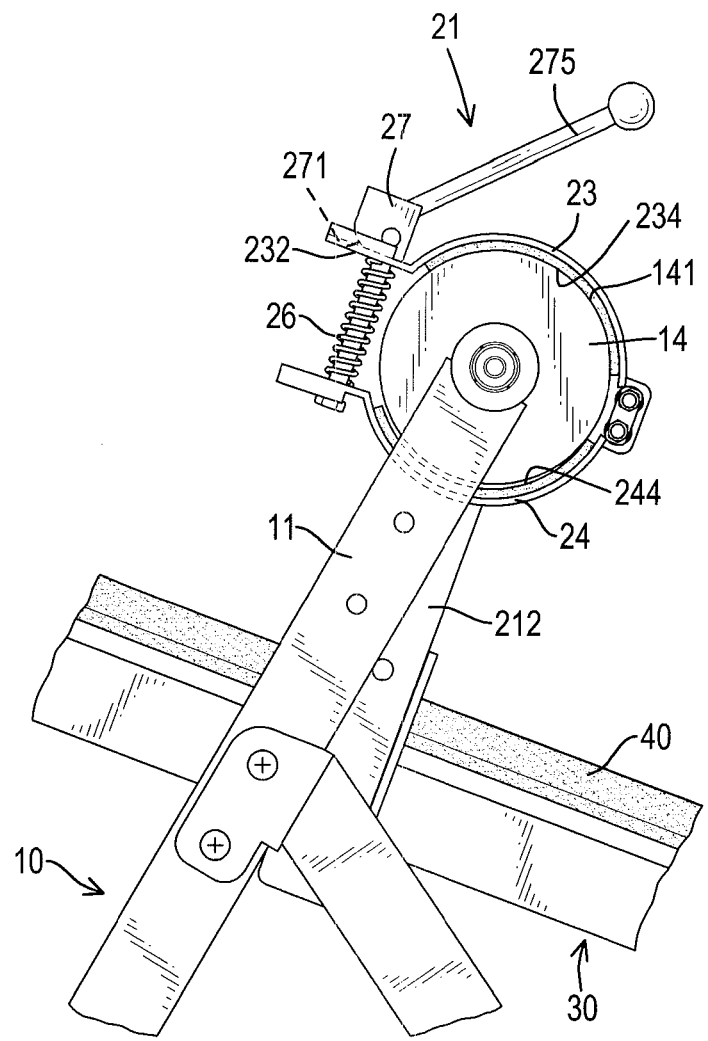
FIG. 4 is an enlarged side view of the inverted machine in FIG. 1.
Figure 5:
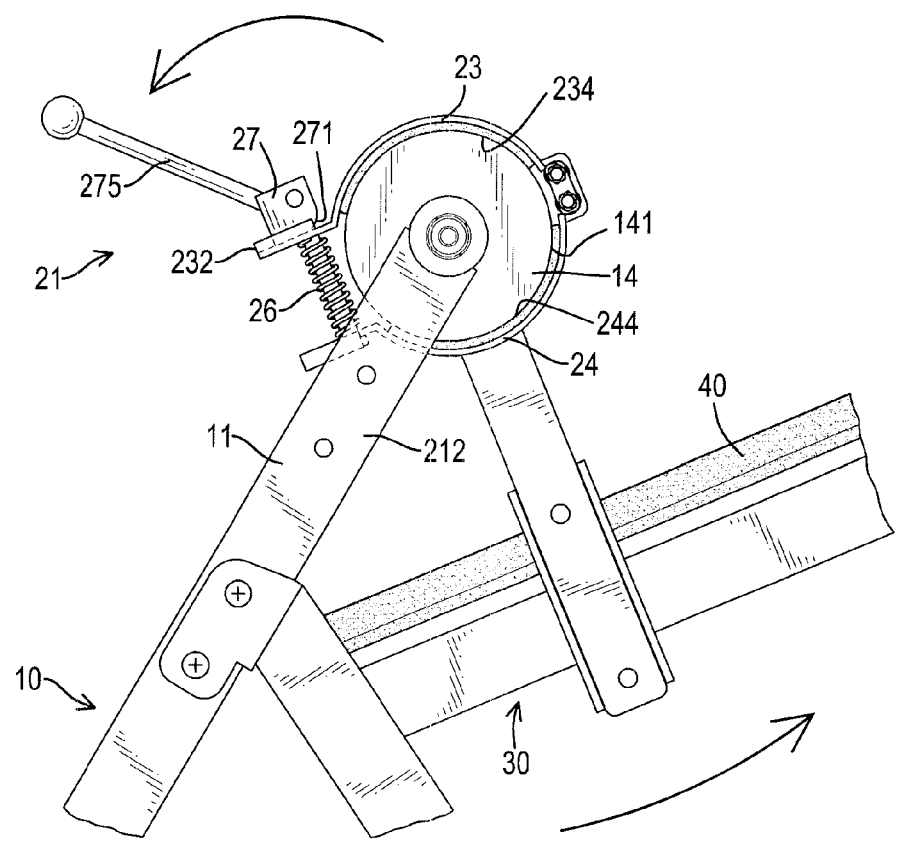
FIG. 5 is an enlarged operational side view of the inverted machine in FIG. 1.
Figure 6:
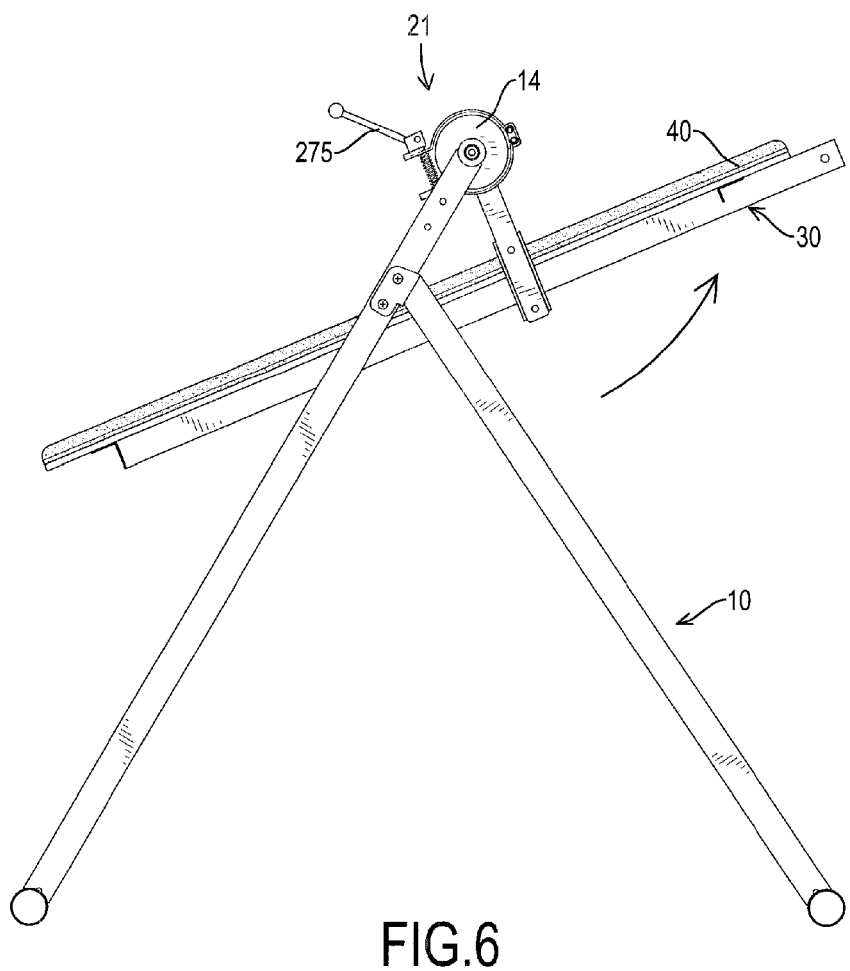
FIG. 6 is an operational side view of the inverted machine in FIG. 5.

With reference to FIGS. 1 to 3, the table 40 that is mounted on the connecting frame 30 can be rotated relative to the supporting bracket 10 by the rotating rod 211 and the pivotal shaft 22 pivotally connected to the mounting jackets 12 of the supporting bracket 10. With reference to FIGS. 4 to 6, when a user lies on the table 40 and wants to hold the table 40 with the supporting bracket 10 at a specific slant angle relative to the supporting bracket 10, the handle 275 of the cam device 27 is pulled backwardly to enable the curved face 271 to move and to abut against the top face of the extending board 232 of the upper clamping slice 23. Because the distance between the outer pivot hole 273 and the rear side of the cam device 27 is longer than the distance between the outer pivot hole 273 and the bottom of the cam device 27, the extending boards 232, 242 are moved toward each other to press the spring 26 and the brake bands 234, 244 of the clamping slices 23, 24 will abut against the friction face 141 of the locating sheath 14. Consequently, the clamping slices 23, 24 of the orientating assembly 20 are securely abut against the locating sheath 14 of the supporting bracket 10 and this can securely hold the table 40 with the supporting frame 10 at the specific slant angle.

In addition, when the user wants to adjust the slant angle of the table 40 relative to the supporting bracket 10, the handle 275 is pulled forwardly to the original position to enable the curved face 271 to separate from the top face of the extending board 232 of the upper clamping slice 23. Then, the extending boards 232, 242 are moved away from each other by the spring 26 and this can enable the brake bands 234, 244 of the clamping slices 23, 24 to separate from the friction face 141 of the locating sheath 14. Consequently, the table 40 can be rotated relative to the supporting bracket 10 by the rotating rod 211 and the pivotal shaft 22 pivotally connected to the mounting jackets 12 of the supporting bracket 10. When the table 40 is rotated at a slant angle according to the user's need, the handle 275 is pulled backwardly to enable the clamping slices 23, 24 to abut against the locating sheath 14. Then, the inverted machine in accordance with the present invention can adjust the table 40 at multiple angles relative to the supporting bracket 10 easily.

Additionally, when the user gets on and off the table 40, the clamping slices 23, 24 can be abutted against the locating sheath 14 by pulling the handle 275 of the cam device 27, and this can securely hold the table 40 with the supporting bracket 10 without rotating. Then, the user can get on and off the table 40 of the inverted machine safely. The inverted machine in accordance with the present invention can enable the user to adjust the table 40 at any desired angle, and can also maintain the angle of the table 40 to allow the operator to completely relax sustainablly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An inverted machine comprising:
   a supporting bracket having
      a rear frame having two supporting shafts defined respectively as a first supporting shaft and a second supporting shaft, and each one of the supporting shafts having a top end and an inner surface;
      a front frame connected to the first supporting shaft and the second supporting shaft of the rear frame below the top ends of the first supporting shaft and the second supporting shaft;
      a swing space defined between the rear frame and the front frame of the supporting bracket;
      two mounting jackets being cylindrical, defined respectively as a first mounting jacket and a second mounting jacket, the first mounting jacket transversally mounted on the top end of the first supporting shaft and the second mounting jacket transversally mounted on the top end of the second supporting shaft and the two mounting jackets aligning with each other, and each one of the mounting jackets having an inner end and an outer end, and the inner end of the first mounting jacket extending out of the inner surface of the first supporting shaft and the inner end of the second mounting jacket extending out of the inner surface of the second supporting shaft; and
      a locating sheath mounted around the first mounting jackets via the inner end of the first mounting jacket and having an external surface and a friction face formed around the external surface of the locating sheath;
   an orientating assembly connected to the rear frame of the supporting bracket and having
      a brake locator connected to the first mounting jacket that is connected to the locating sheath and having
         a rotating rod rotatably mounted in the first mounting jacket and having an inner end extending out of the inner end of the first mounting jacket;
         a connecting beam connected to and protruding downwardly from the inner end of the rotating rod; and
         a linking mount formed on and protruding from the connecting beam adjacent to the inner end of the rotating rod and having an outer side facing the locating sheath and two mounting rods formed on and protruding from the outer side of the linking mount at an interval, the two mounting rods being respectively an upper mounting rod and a lower mounting rod;
      a rotating shaft rotatably connected to the second mounting jacket that is opposite to the brake locator and having an inner end and a connecting beam connected to and protruding from the inner end of the rotating shaft and paralleling the connecting beam of the brake locator;
      an upper clamping slice being semi-arc shaped, pivotally connected to the linking mount of the brake locator and having
         a front end;
         a rear end;
         an internal surface mounted around the friction face of the locating sheath;
         a mounting tube transversally formed on and protruding from the front end of the upper clamping slice and rotatably mounted around the upper mounting rod of the linking mount;
         an extending board formed on and protruding from the rear end of the upper clamping slice and having a top face;
         a through hole formed through the extending board and
         a brake band mounted on the internal surface of the upper clamping slice and abutting the friction face of the locating sheath;
      a lower clamping slice being semi-arc shaped, pivotally connected to the linking mount of the brake locator and having
         a front end;
         a rear end;
         an internal surface mounted around the friction face of the locating sheath;
         a mounting tube transversally formed on and protruding from the front end of the lower clamping slice and rotatably mounted around the lower mounting rod of the linking mount;
         an extending board formed on and protruding from the rear end of the lower clamping slice;
         a through hole formed through the extending board; and
         a brake band mounted on the internal surface of the lower clamping slice and abutting the friction face of the locating sheath;
      a pulling rod connected to the clamping slices and having a top end and a bottom end, the bottom end mounted through the through holes of the extending boards;
      a spring mounted around the pulling rod and having two ends respectively abutting the extending boards of the clamping slices; and
      a cam device pivotally connected to the pulling rod, abutting the extending board of the upper clamping slice and having a top and a handle formed on and protruding from the top of the cam device upwardly and forwardly;
   a connecting frame connected to the connecting beams of the orientating assembly between the first supporting shaft and the second supporting shaft to enable the connecting frame to rotate relative to the supporting bracket and having a top face; and
   a table securely mounted on the top face of the connecting frame in the swing space of the supporting bracket.

2. The inverted machine as claimed in claim 1, wherein
the through hole of the upper clamping slice has a diameter;
the pulling rod has a head formed on and protruding from
   the top end of the pulling rod above the extending board
   of the upper clamping slice and having
      a diameter being larger than the diameter of the through
         hole of the upper clamping slice;
      two opposite sides; and
      an inner pivot hole formed through the opposite sides of
         the head;
the cam device has
   a bottom being flat and abutting the top face of the
      extending board of the upper clamping slice;
   a rear side;
   a front side;
   two sidewalls;
   a curved face formed on the rear side of the cam device
      between the bottom and the top of the cam device;
   a mounting groove formed through the bottom and the
      front side of the cam device between the rear side and
      the sidewalls of the cam device and mounted around
      the head of the pulling rod;
   an outer pivot hole formed through the sidewalls of the
      cam device near the front side and the bottom of the
      cam device, communicating with the mounting
      groove and aligning with the inner pivot hole of the
      head;
   a pivot rod mounted through the pivot holes of the head
      and the cam device to connect the cam device pivotally with the head of the pulling rod; and
wherein a distance between the outer pivot hole and the rear
   side of the cam device is longer than a distance between
   the outer pivot hole and the bottom of the cam device.
3. The inverted machine as claimed in claim 2, wherein
the extending board of the lower clamping slice has a
   bottom face;
the pulling rod has
   a threaded segment formed around the bottom end of the
      pulling rod and extending out of the extending board
      of the lower clamping slice; and
   a nut screwed with the threaded segment of the pulling
      rod and abutting the bottom face of the extending
      board of the lower clamping slice.
4. The inverted machine as claimed in claim 3, wherein
each one of the mounting jackets has two liner collars
   respectively mounted in the ends of the mounting jacket;
the rotating rod of the brake locator is rotatably mounted in
   the liner collars of the first mounting jacket; and
the rotating shaft is rotatably mounted in the liner collars of
   the second mounting jacket that is opposite to the brake
   locator.
5. The inverted machine as claimed in claim 1, wherein
the extending board of the lower clamping slice has a
   bottom face;
the pulling rod has
   a threaded segment formed around the bottom end of the
      pulling rod and extending out of the extending board
      of the lower clamping slice; and
a nut screwed with the threaded segment of the pulling rod
   and abutting the bottom face of the extending board of
   the lower clamping slice.
6. The inverted machine as claimed in claim 5, wherein
each one of the mounting jackets has two liner collars
   respectively mounted in the ends of the mounting jacket;
the rotating rod of the brake locator is rotatably mounted in
   the liner collars of the first mounting jacket; and
the rotating shaft is rotatably mounted in the liner collars of
   the second mounting jacket that is opposite to the brake
   locator.

\* \* \* \* \*